United States Patent
Hamajima et al.

(10) Patent No.: US 9,688,831 B2
(45) Date of Patent: Jun. 27, 2017

(54) PHENOL RESIN FOAM

(71) Applicant: Asahi Kasei Construction Materials Corporation, Tokyo (JP)

(72) Inventors: Masato Hamajima, Tokyo (JP); Shigemi Mukaiyama, Tokyo (JP); Ken Ihara, Tokyo (JP); Atsushi Kumada, Tokyo (JP)

(73) Assignee: ASAHI KASEI CONSTRUCTION MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/108,109

(22) PCT Filed: Dec. 25, 2014

(86) PCT No.: PCT/JP2014/084404
§ 371 (c)(1),
(2) Date: Jun. 24, 2016

(87) PCT Pub. No.: WO2015/099086
PCT Pub. Date: Jul. 2, 2015

(65) Prior Publication Data
US 2016/0326331 A1   Nov. 10, 2016

(30) Foreign Application Priority Data

Dec. 27, 2013  (JP) ................................ 2013-271896
Mar. 13, 2014  (JP) ................................ 2014-050212
Mar. 13, 2014  (JP) ................................ 2014-050214

(51) Int. Cl.
C08J 9/14      (2006.01)
B32B 5/00      (2006.01)
C08J 9/00      (2006.01)
C08L 61/06     (2006.01)
B32B 5/18      (2006.01)

(52) U.S. Cl.
CPC .............. *C08J 9/149* (2013.01); *B32B 5/00* (2013.01); *B32B 5/18* (2013.01); *C08J 9/0061* (2013.01); *C08J 9/141* (2013.01); *C08J 9/144* (2013.01); *C08J 9/146* (2013.01); *C08L 61/06* (2013.01); *C08J 2203/14* (2013.01); *C08J 2203/16* (2013.01); *C08J 2203/162* (2013.01); *C08J 2203/182* (2013.01); *C08J 2205/044* (2013.01); *C08J 2205/052* (2013.01); *C08J 2207/00* (2013.01); *C08J 2361/10* (2013.01); *C08J 2471/02* (2013.01)

(58) Field of Classification Search
CPC .......................................................... C08J 9/14
USPC ........................................................... 521/98
See application file for complete search history.

(56) References Cited

U.S. PATENT DOCUMENTS

| | | | |
|---|---|---|---|
| 2010/0016457 A1 | 1/2010 | Bowman et al. | |
| 2010/0105788 A1 | 4/2010 | Chen et al. | |

FOREIGN PATENT DOCUMENTS

| | | |
|---|---|---|
| CN | 102159634 A | 8/2011 |
| EP | 1095970 A1 | 5/2001 |
| JP | 2010-522819 A | 7/2010 |
| JP | 2013-64139 A | 4/2013 |
| JP | 2639260 A1 | 9/2013 |
| WO | WO 2007/002703 A2 | 1/2007 |
| WO | WO 2011/031697 A2 | 3/2011 |

OTHER PUBLICATIONS

English translation of the International Preliminary Report on Patentability and Written Opinion of the International Searching Authority (Forms PCT/IB/338, PCT/IB/373 and PCT/ISA/237), dated Jul. 7, 2016, for International Application No. PCT/JP2014/084404.
International Search Report (Form PCT/ISA/210), dated Jan. 27, 2015, for International Application No. PCT/JP2014/084404, together with an English translation thereof.
European Search Report, dated Sep. 15, 2016, for European Application No. 14873157.3.

*Primary Examiner* — Duc Truong
(74) *Attorney, Agent, or Firm* — Birch, Stewart, Kolasch & Birch, LLP

(57) ABSTRACT

There is disclosed a phenol resin foam comprising a phenol resin, a hydrocarbon having 6 or less carbon atoms, and at least one halogenated hydroolefin selected from the group consisting of hydrofluoroolefins and hydrochlorofluoroolefins, and the phenol resin foam having the density of 10 kg/m³ or more and 150 kg/m³ or less, wherein the sum of the content of the hydrocarbon having 6 or less carbon atoms and the content of the hydrogenated hydroolefin is from 0.23 to 0.90 mol, the content of the hydrocarbon having 6 or less carbon atoms is from 0.03 to 0.85 mol, and the content of the halogenated hydroolefin is from 0.05 to 0.85 mol, per $22.4 \times 10^{-3}$ m³ of spatial volume in the phenol resin foam.

23 Claims, No Drawings

PHENOL RESIN FOAM

TECHNICAL FIELD

The present invention relates to a phenol resin foam.

BACKGROUND ART

High airtightness and high thermal insulation of residential houses have been required in recent years due to energy-saving consciousness, obligation to comply with the next-generation energy saving standard and the like. With such enhancement in heat insulation performance of residential houses, it is expected that the necessary thickness of thermal-insulating materials is increased. Because of oppression to the interior living space and the limited space inside wall bodies, a problem of necessity for changes in the design due to addition of thermal-insulating materials has been caused. The thermal-insulating material is constructed inside the wall body, and thus, its replacement during habitation is very difficult. Accordingly, it is required that the thermal insulation performance be maintained for a long period.

As thermal-insulating materials for residential house applications, fiber thermal-insulating materials, such as glass wool and rock wool or foamed plastic thermal-insulating materials formed by foaming styrene, urethane, or phenol resins are used. Of these, as for the foamed plastic thermal-insulating material, it is known that its thermal insulation performance is greatly influenced by the type and condition of a foaming agent included in its cells.

Chlorofluorocarbons (CFCs), of which the gas thermal conductivity is low, had been conventionally used as a foaming agent for foamed plastic thermal-insulating materials, but abolition of the use of CFCs was specified by the Montreal Protocol, adopted in 1987, because CFCs are significantly responsible for destruction of the ozone layer and climate change. As a result, a shift of the foaming agent to hydrofluorocarbons (HFCs), of which the ozone depletion coefficient and the global warming coefficient are relatively low as a foaming agent, has progressed. However, since HFCs still have a high global warming coefficient, a shift to hydrocarbon foaming agents has been required.

The hydrocarbon foaming agents, of which the ozone depletion coefficient and the global warming coefficient are very low, are highly excellent foaming agents from the viewpoint of environmental destruction. Meanwhile, there is an issue of their higher thermal conductivity and flammability, compared to the conventional chlorofluorocarbon foaming agents, and a solution to the issue is required.

In Patent Literature 1 and Patent Literature 2, a large number of gas species are disclosed as halogenated hydroolefins, of which the ozone depletion coefficient is zero and of which the global warming coefficient is low.

CITATION LIST

Patent Literature

Patent Literature 1: JP 2013-64139 A
Patent Literature 2: JP 2010-522819 A

SUMMARY OF INVENTION

Technical Problem

However, in Patent Literature 1 and Patent Literature 2, only specific examples of application to a polyurethane resin foam or a polyisocyanate resin foam as a foaming agent are described, and no application example to a phenol resin foam is described. The aforementioned technique is not optimized for phenol resin foam applications, and, in the case of being used for phenol resin, the initial K factor of the foam obtained is insufficient.

In Patent Literature 1 and Patent Literature 2, a large number of halogenated hydroolefins are disclosed.

For example, in 1-chloro-3,3,3-trifluoropropene, there is a feature in which its ozone depletion coefficient and global warming coefficient are extremely low. However, since the high boiling point of the substance, 19° C., is relatively high, there has been a problem of deterioration in the thermal conductivity in a low temperature region at 10° C. and the like, where the foaming agent is liquefied. The change over time in the thermal conductivity of the phenol resin foam is not disclosed, but in the case where the above 1-chloro-3,3,3-trifluoropropene, of which the affinity for the phenol resin is high, is used singly, the closed cell ratio decreases and the diffusion rate of the foaming agent outside the foam increases, and thus, it is estimated that the change over time in the thermal conductivity increases. Since the above halogenated hydroolefin is very expensive, there are few economic advantages in using it singly.

In 1,3,3,3-tetrafluoropropene, there is a feature in which its ozone depletion coefficient and global warming coefficient are extremely low. However, since the boiling point of the substance, −19° C., is relatively low, there are problems, such as deterioration in the thermal conductivity due to decrease in the closed cell ratio caused by abrupt occurrence of foaming during molding, and necessity of a large amount of the foaming agent because the foaming agent becomes likely to volatile during molding. The change over time in the thermal conductivity of the phenol resin foam is not disclosed, but in the case where the above 1,3,3,3-tetrafluoropropene, of which the affinity for the phenol resin is high, is used singly, it is expected that the closed cell ratio decreases and the diffusion rate of the foaming agent outside the foam increases, and thus, it is estimated that the change over time in the thermal conductivity increases.

In 1,1,1,4,4,4-hexafluoro-2-butene, there is a feature in which its ozone depletion coefficient and global warming coefficient are extremely low. However, since the boiling point of the substance, 33° C., is relatively high, there has been a problem of deterioration in the thermal conductivity in a low temperature region at 10° C. and the like, where the foaming agent is liquefied. The change over time in the thermal conductivity of the phenol resin foam is not disclosed, but in the case where the above 1,1,1,4,4,4-hexafluoro-2-butene, of which the affinity for the phenol resin is high, is used singly, it is expected that the closed cell ratio decreases and the diffusion rate of the foaming agent outside the foam increases, and thus, it is estimated that the change over time in the thermal conductivity increases.

An object of the present invention is to provide a phenol resin foam that minimizes environmental loads and can maintain excellent thermal insulation performance for a long period by using a foaming agent of which the ozone depletion coefficient is substantially zero and of which the global warming coefficient is extremely low.

Solution to Problem

The present inventors have extensively studied to achieve the above object to find that excellent initial thermal insulation performance is achieved and a low thermal conductivity is maintained for a long period by blending a halogenated hydroolefin and a hydrocarbon at a specific ratio and setting the amount of a foaming agent existing in the foam to a specific range thereby having completed the present invention.

The present invention provides the following [1] to [23].

[1] A phenol resin foam comprising a phenol resin, a hydrocarbon having 6 or less carbon atoms, and at least one halogenated hydroolefin selected from the group consisting of hydrofluoroolefins and hydrochlorofluoroolefins, and the phenol resin having the density of 10 kg/m$^3$ or more and 150 kg/m$^3$ or less, wherein the sum of the content of the hydrocarbon having 6 or less carbon atoms and the content of the halogenated hydroolefin is from 0.23 to 0.90 mol, the content of the hydrocarbon having 6 or less carbon atoms is from 0.03 to 0.85 mol, and the content of the halogenated hydroolefin is from 0.05 to 0.85 mol, per 22.4×10$^{-3}$ m$^3$ of spatial volume in the phenol resin foam.

[2] The phenol resin foam according to [1], wherein the halogenated hydroolefin comprises at least one selected from the group consisting of 1-chloro-3,3,3-trifluoropropene, 1,3,3,3-tetrafluoropropene, and 1,1,1,4,4,4-hexafluoro-2-butene.

[3] The phenol resin foam according to [1] or [2], wherein the average boiling point of the hydrocarbon having 6 or less carbon atoms and the halogenated hydroolefin is from −15° C. to 48° C.

[4] The phenol resin foam according to any of [1] to [3], wherein the hydrocarbon having 6 or less carbon atoms comprises pentane and/or pentene.

[5] The phenol resin foam according to [2], wherein the halogenated hydroolefin is 1-chloro-3,3,3-trifluoropropene.

[6] The phenol resin foam according to [5], wherein the average boiling point of the hydrocarbon having 6 or less carbon atoms and the 1-chloro-3,3,3-trifluoropropene is from 15° C. to 45° C.

[7] The phenol resin foam according to [5] or [6], wherein the hydrocarbon having 6 or less carbon atoms comprises pentane and/or pentene.

[8] The phenol resin foam according to [7], wherein the hydrocarbon having 6 or less carbon atoms comprises 60 to 100 mol % in total of pentane and/or pentene and 0 to 40 mol % of one or two or more selected from hydrocarbons having the boiling point of −50° C. to 5° C., based on the total amount of the hydrocarbon, and wherein the average boiling point of the hydrocarbon having 6 or less carbon atoms is 0° C. or more and 50° C. or less.

[9] The phenol resin foam according to [8], wherein the hydrocarbon having the boiling point of −50° C. to 5° C. comprises isobutane.

[10] The phenol resin foam according to [2], wherein the halogenated hydroolefin is 1,3,3,3-tetrafluoropropene.

[11] The phenol resin foam according to [10], the average boiling point of the hydrocarbon having 6 or less carbon atoms and 1,3,3,3-tetrafluoropropene is from −15° C. to 45° C.

[12] The phenol resin foam according to [10] or [11], wherein the hydrocarbon having 6 or less carbon atoms comprises pentane and/or pentene.

[13] The phenol resin foam according to [12], wherein the hydrocarbon having 6 or less carbon atoms comprises 40 to 100 mol % in total of pentane and/or pentene and 0 to 60 mol % of one or two or more selected from hydrocarbons having the boiling point of −50° C. to 5° C., based on the total amount of the hydrocarbon, and wherein the average boiling point of the hydrocarbon having 6 or less carbon atoms is 10° C. or more and 50° C. or less.

[14] The phenol resin foam according to [13], wherein the hydrocarbon having the boiling point of −50° C. to 5° C. comprises isobutane.

[15] The phenol resin foam according to [2], wherein the halogenated hydroolefin is 1,1,1,4,4,4-hexafluoro-2-butene.

[16] The phenol resin foam according to [15], wherein the average boiling point of the hydrocarbon having 6 or less carbon atoms and 1,1,1,4,4,4-hexafluoro-2-butene is from 0° C. to 48° C.

[17] The phenol resin foam according to [15] or [16], wherein the hydrocarbon having 6 or less carbon atoms comprises pentane and/or pentene.

[18] The phenol resin foam according to [17], wherein the hydrocarbon having 6 or less carbon atoms comprises 5 to 100 mol % in total of pentane and/or pentene and 0 to 95 mol % of one or two or more selected from hydrocarbons having the boiling point of −50° C. to 5° C., based on the total amount of the hydrocarbon, and wherein the average boiling point of the hydrocarbon having 6 or less carbon atoms is −10° C. or more and 50° C. or less.

[19] The phenol resin foam according to [18], wherein the hydrocarbon having the boiling point of −50° C. to 5° C. comprises isobutane.

[20] The phenol resin foam according to any of [1] to [19], wherein the thermal conductivities under 10° C. and 23° C. environments, respectively, are less than 0.0205 W/m·k.

[21] The phenol resin foam according to any of [1] to [20], having the closed cell ratio of 90% or more, the average cell diameter of 40 μm or more and 300 μm or less, and the void area ratio of 0.2% or less.

[22] The phenol resin foam according to any of [1] to [21], wherein the phenol resin has a urea bond.

[23] The phenol resin foam according to any of [1] to [22], wherein the thermal conductivity under a 10° C. environment after conditions of being left to stand in a 110° C. atmosphere for 14 days is less than 0.020 W/m·k.

Advantageous Effects of Invention

According to the present invention, it is possible to provide a phenol resin foam that is excellent in initial thermal insulation performance as well as can maintain a low thermal conductivity for a long period. Also, the present invention is economically advantageous compared to the case where a very expensive halogenated hydroolefin is used singly.

DESCRIPTION OF EMBODIMENTS

An embodiment to implement the present invention (referred to as "the present embodiment" hereinbelow) will be described hereinbelow in detail. It should be noted that the present invention is not limited to the following embodiment.

A phenol resin foam of the present embodiment contains a phenol resin, a hydrocarbon having 6 or less carbon atoms, and at least one halogenated hydroolefin selected from the group consisting of hydrofluoroolefins and hydrochlorofluoroolefins. The density of the phenol resin foam is a phenol resin foam of 10 kg/m$^3$ or more and 150 kg/m$^3$ or less. The sum of the content of the hydrocarbon having 6 or less carbon atoms and the content of the hydrogenated hydroolefin is from 0.23 to 0.90 mol, the content of the hydrocarbon having 6 or less carbon atoms is from 0.03 to 0.85 mol, and the content of the halogenated hydroolefin is from 0.05 to 0.85 mol, per 22.4×10$^{-3}$ m$^3$ spatial volume in the phenol resin foam.

The phenol resin foam of the present embodiment contains at least one halogenated hydroolefin selected from the group consisting of hydrofluoroolefins and hydrochlorofluoroolefins. There is a case where the halogenated hydroolefin, which has a high affinity for phenol resins, reduces the viscosity of the resin on foaming and thus cannot form a sufficient closed cell structure if used singly as the foaming agent. Accordingly, the diffusion rate of the foaming agent outside the foam is high, and there has been a problem of deterioration in the thermal conductivity after a long period has passed after construction, compared to immediately after construction. Thus, the present inventors have found that the above problem can be solved by blending a halogenated hydroolefin and a hydrocarbon having 6 or less carbon atoms at a specific ratio and setting the amount of a foaming agent existing in the foam to a specific range.

The hydrofluoroolefin is a compound that has hydrogen atoms and fluorine atoms bound to carbon atoms and has a carbon-carbon unsaturated bond. The hydrochlorofluoroolefin is a compound that has hydrogen atoms, fluorine atoms, and chlorine atoms bound to carbon atoms and has a carbon-carbon unsaturated bond. Examples of the at least one halogenated hydroolefin selected from the group consisting of hydrofluoroolefins and hydrochlorofluoroolefins according to the present embodiment include 1-chloro-3,3,3-trifluoropropene, 1,3,3,3-tetrafluoropropene 1,1,1,4,4,4-hexafluoro-2-butene, and 2,3,3,3-tetrafluoro-1-propene. As the halogenated hydroolefin, among these, 1-chloro-3,3,3-trifluoropropene, 1,3,3,3-tetrafluoropropene, or 1,1,1,4,4,4-hexafluoro-2-butene is preferable. These halogenated hydroolefins may be used singly or two or more of these may be used in combination. Furthermore, other saturated halogenated hydroolefin may be added and used.

The hydrocarbon having 6 or less carbon atoms of the present embodiment is a compound composed only of hydrogen atoms and carbon atoms, and examples include aliphatic hydrocarbons of alkanes, alkenes, and dienes such as methane, ethane, ethylene, propane, propylene, normal-butane, isobutane, butene, butadiene, normal-pentane, isopentane, neopentane, pentene, normal-hexane, isohexane, and hexene and cyclic aliphatic hydrocarbons of cycloalkenes and cycloalkenes such as cyclobutane, cyclopentane, and cyclohexene.

The total (total amount) of the content of the hydrocarbon having 6 or less carbon atoms and the content of the halogenated hydroolefin in the phenol resin foam of the present embodiment is from 0.23 to 0.90 mol, preferably from 0.25 to 0.90 mol, more preferably from 0.3 to 0.80 mol, still more preferably from 0.35 to 0.75 mol, particularly preferably from 0.40 to 0.70 mol, per $22.4 \times 10^{-3}$ m$^3$ (22.4 L) spatial volume in the phenol resin foam. When the total amount of the hydrocarbon having 6 or less carbon atoms and the halogenated hydroolefin is less than the aforementioned 0.23 mol, there is a concern that deterioration in the thermal insulation performance increases in the course of replacement of the foaming gas included in the cells with air over time after construction of the thermal-insulating material. Furthermore, there is a tendency for a compression strength to be reduced by the fact that the internal pressure of the closed cells is reduced excessively. When the total amount of the hydrocarbon having 6 or less carbon atoms and the halogenated hydroolefin is excessively larger than the aforementioned 0.90 mol, the gas included in the cells is likely to be liquefied because the internal pressure of the cells increases, and there is a concern that the initial thermal insulation performance in particular at 10° C. is reduced.

The content of the halogenated hydroolefin in the phenol resin foam of the present embodiment is from 0.05 to 0.85 mol, preferably from 0.1 to 0.7 mol, more preferably from 0.2 to 0.6 mol, per $22.4 \times 10^{-3}$ m$^3$ (22.4 L) spatial volume in the phenol resin foam. When the content of the halogenated hydroolefin is less than the aforementioned 0.05 mol, a characteristic in which the gas thermal conductivity is low is not sufficiently exploited, and there is a tendency for the initial thermal insulation performance at 10° C. and 23° C. to be reduced. When the content of the halogenated hydroolefin is excessively higher than the aforementioned 0.85 mol, the viscosity of the phenol resin on foaming is reduced because of plasticization of the resin due to the high affinity between the halogenated hydroolefin and the phenol resin. Consequently, the cell membrane of the phenol resin foam is broken to thereby fail to form a sufficient closed cell structure, and there is a concern that a long-term thermal insulation performance is reduced.

The content of the hydrocarbon having 6 or less carbon atoms in the phenol resin foam of the present embodiment is from 0.03 to 0.85 mol, preferably from 0.05 to 0.85 mol, more preferably from 0.05 to 0.8 mol, still more preferably from 0.05 to 0.7 mol, particularly preferably from 0.05 to 0.6 mol, most preferably from 0.05 to 0.5 mol, per $22.4 \times 10^{-3}$ m$^3$ (22.4 L) spatial volume in the phenol resin foam. When the content of the hydrocarbon having 6 or less carbon atoms is less than the aforementioned 0.03 mol, it is not possible to suppress plasticization of the phenol resin due to the halogenated hydroolefin, and the viscosity of the phenol resin on foaming is reduced. Consequently, the cell membrane of the phenol resin foam is broken to thereby fail to form a sufficient closed cell structure, and there is a concern that a long-term thermal insulation performance is reduced. When the content of the hydrocarbon having 6 or less carbon atoms is excessively higher than the aforementioned 0.85 mol, there is a tendency for the flame retardancy of the phenol resin foam obtained to deteriorate.

It is preferable that the phenol resin foam of the present embodiment comprise pentane and/or pentene (hereinafter, may be described as pentanes) as the hydrocarbon having 6 or less carbon atoms. In the present embodiment, examples of pentane include normal-pentane, isopentane, neopentane, and cyclopentane. Pentanes to be used are not particularly limited, but cyclopentane and isopentane are suitably used, cyclopentane is particularly suitably used, because of the thermal conductivity, the foamability, the boiling point and the like in a gas state. These pentanes may be used singly or two or more of the gases may be used in combination. Furthermore, other hydrocarbon may be mixed.

The average boiling point X1 of the hydrocarbon having 6 or less carbon atoms and the halogenated hydroolefin in the phenol resin foam of the present embodiment may be from −15° C. to 48° C.

In the case where 1-chloro-3,3,3-trifluoropropene is used as the halogenated hydroolefin, the average boiling point X1 of the hydrocarbon having 6 or less carbon atoms and 1-chloro-3,3,3-trifluoropropene in the phenol resin foam of the present embodiment may be from 15° C. to 45° C., is preferably from 15° C. to 40° C., more preferably from 19.5° C. to 37° C.

In the case where 1,3,3,3-tetrafluoropropene is used as the halogenated hydroolefin, the average boiling point X1 of the hydrocarbon having 6 or less carbon atoms and 1,3,3,3-tetrafluoropropene in the phenol resin foam of the present embodiment may be from −15° C. to 45° C., is preferably from −5° C. to 40° C., more preferably from 0° C. to 30° C.

In the case where 1,1,1,4,4,4-hexafluoro-2-butene is used as the halogenated hydroolefin, the average boiling point X1 of the hydrocarbon having 6 or less carbon atoms and 1,1,1,4,4,4-hexafluoro-2-butene in the phenol resin foam of the present embodiment may be from 0° C. to 48° C., is preferably from 5° C. to 40° C., more preferably from 10° C. to 35° C.

When the average boiling point is excessively low, the foaming rate increases excessively, and the cell membrane tends to be broken on foaming. Thus, there is a concern that the long-term thermal insulation performance is likely to be reduced. In contrast, when the average boiling point is excessively high, the foaming agent is likely to be liquefied, and there is a tendency for the thermal conductivity at 10° C. to increase.

It is possible to determine the average boiling point X of a plurality of the materials of the present embodiment by the following expression (1):

$$\text{Average boiling point } X = a \times Ta + b \times Tb + c \times Tc + \quad (1)$$

(Wherein, each content of the subject materials (A, B, C, and the like) is a, b, c, and the like (molar fraction), and boiling points are Ta, Tb, Tc, and the like (° C.).)

In the phenol resin foam of the present embodiment, the thermal conductivities measured under 10° C. and 23° C. environments, respectively, described below are preferably less than 0.0205 W/m·k, more preferably less than 0.0190 W/m·k, still more preferably less than 0.0185 W/m·k, particularly preferably less than 0.0180 W/m·k, and most preferably less than 0.0175 W/m·k. The thermal conductivity of the thermal-insulating material generally tends to be lower as the temperature is lower. The thermal conductivity measured under a 10° C. environment described below is preferably less than 0.0190 W/m·k, more preferably less than 0.0180 W/m·k, still more preferably less than 0.0175 W/m·k, particularly preferably less than 0.0170 W/m·k, and most preferably less than 0.0165 W/m·k.

In the present embodiment, it is preferable that the thermal conductivity of the phenol resin foam under a 10° C. environment after conditions of being left to stand in a 110° C. atmosphere for 14 days, which is the thermal conductivity after acceleration test corresponding to a long-term use, be less than 0.020 W/m·k, it is more preferable that the thermal conductivity be less than 0.019 W/m·k, it is still more preferable that the thermal conductivity be less than 0.018 W/m·k, and it is particularly preferable that the thermal conductivity be less than 0.0175 W/m·k. The thermal conductivity under a 10° C. environment after conditions of being left to stand in a 110° C. atmosphere for 14 days is measured in accordance with a method for measuring the thermal conductivity after acceleration test described below.

When the closed cell ratio of the phenol resin foam in the present embodiment becomes lower, deterioration in the thermal insulation performance over time becomes likely to occur. Thus, a closed cell ratio of 90% or more is preferable, a closed cell ratio of 95% or more is more preferable, a closed cell ratio of 97% or more and 100% or less is particularly preferable.

In the phenol resin foam of the present embodiment, large-diameter pores called voids may exist partially. When a void area ratio is excessively large, there is a tendency for the initial thermal insulation performance to deteriorate, and there is a tendency for deterioration in the thermal insulation performance over time to easily occur. As the void area ratio in the present embodiment, 0.2% or less is preferable, 0.1% or less is more preferable, 0.08% or less is still more preferable, 0.05% or less is particularly preferable. When the void area ratio becomes excessively large, the thermal conductivity increases because heat flows from the void portion, structural defects occur from the void as the starting point, and thus, the compression strength tends to be reduced.

Herein, a large-diameter pores of which the area is 2 mm$^2$ or more is defined as a void. The void area ratio is measured in compliance with the measuring method described in Japanese Patent No. 3813062 description. That is, the ratio of the area which is occupied by the large-diameter pores (voids) of which the area is 2 mm$^2$ or more in the cutting cross-sectional surface obtained by cutting a substantially center part of the phenol resin foam in the thickness direction in parallel with the front and back surfaces (the two main surfaces opposed to each other) is defined as a void area ratio.

It is preferable that the phenol resin foam in the present embodiment comprise a hydrocarbon having the boiling point of −50° C. to 5° C. as the hydrocarbon having 6 or less carbon atoms other than pentanes, in respect to suppressing liquefaction of the foaming gas included and to achieving a necessary foaming ratio with a lesser amount of the foaming agent added.

The hydrocarbon having the boiling point of −50° C. to 5° C. in the present embodiment is not limited to the following, and examples include propane, propylene, isobutane, normal-butane, 1-butene, cis-2-butene, trans-2-butene, 2-methylpropene, and butadiene. As the hydrocarbon having the boiling point of −50° C. to 5° C., among these, propane, normal-butane, and isobutane are preferable, and isobutane is particularly preferable, from the viewpoint of a good thermal conductivity and stability. These may be used singly or two or more of these may be used in combination. Furthermore, other hydrocarbon may be mixed and used.

In the case where 1-chloro-3,3,3-trifluoropropene is used as the halogenated hydroolefin, in the phenol resin foam in the present embodiment, the hydrocarbon having 6 or less carbon atoms comprises pentanes and a hydrocarbon having the boiling point of −50° C. to 5° C., and the average boiling point X2 of the above hydrocarbon having 6 or less carbon atoms calculated by the aforementioned expression (1) may be from 0 to 50° C. The average boiling point X2 is preferably from 5 to 43° C., more preferably from 10 to 40° C. When the average boiling point X2 is excessively low, the thermal conductivity of the mixed gas tends to be high. Furthermore, since the foaming rate of the phenol resin becomes excessively high, breakage of cells is induced on foaming, and thus, the thermal insulation performance tends to deteriorate. When the average boiling point X2 is excessively high, the thermal insulation performance tends to be reduced at a low temperature, particularly at 10° C. because the hydrocarbon becomes likely to be liquefied under low temperatures. It is preferable that the hydrocarbon having 6 or less carbon atoms comprise 60 to 100 mol % of pentanes in total and 0 to 40 mol % of one or two or more selected from hydrocarbons having the boiling point of −50° C. to 5° C. based on the total amount of the hydrocarbon, and it is more preferable that the hydrocarbon comprise 80 to 100 mol % of pentanes in total and 0 to 20 mol % of one or two or more selected from hydrocarbons having the boiling point of −50° C. to 5° C.

In the case where 1,3,3,3-tetrafluoropropene is used as the halogenated hydroolefin, in the phenol resin foam in the present embodiment, the hydrocarbon having 6 or less carbon atoms comprises pentanes and a hydrocarbon having the boiling point of −50° C. to 5° C., and the average boiling point X2 of the above hydrocarbon having 6 or less carbon atoms calculated by the aforementioned expression (1) may be from 10 to 50° C. The average boiling point X2 is preferably from 15 to 50° C., more preferably from 20 to 50° C., and most preferably from 30 to 50° C. When the average boiling point X2 is excessively low, the thermal conductivity of the mixed gas tends to be high. Furthermore, since the foaming rate of the phenol resin becomes excessively high, breakage of cells is induced on foaming, and thus, the thermal insulation performance tends to deteriorate. When the average boiling point X2 is excessively high, the thermal insulation performance tends to be reduced at a low temperature, particularly at 10° C. because the hydrocarbon becomes likely to be liquefied under low temperatures. It is preferable that the hydrocarbon having 6 or less carbon atoms comprise 40 to 100 mol % of pentanes in total and 0 to 60 mol % of one or two or more selected from hydrocarbons having the boiling point of −50° C. to 5° C. based on the total amount of the hydrocarbon, it is more preferable that the hydrocarbon comprise 50 to 100 mol % of pentanes in total and 0 to 50 mol % of one or two or more selected from hydrocarbons having the boiling point of −50° C. to 5° C., it is still more preferable that the hydrocarbon comprise 60 to 100 mol % of pentanes in total and 0 to 40 mol % of one or two or more selected from hydrocarbons having the boiling point of −50° C. to 5° C., and it is most preferable that the hydrocarbon comprise 70 to 100 mol % of pentanes in total and 0 to 30 mol % of one or two or more selected from hydrocarbons having the boiling point of −50° C. to 5° C.

In the case where 1,1,1,4,4,4-hexafluoro-2-butene is used as the halogenated hydroolefin, the phenol resin foam in the present embodiment comprises the hydrocarbon having 6 or less carbon atoms which is pentanes and a hydrocarbon having the boiling point of −50° C. to 5° C., and the average boiling point X2 of the above hydrocarbon having 6 or less carbon atoms calculated by the aforementioned expression (1) may be from −10 to 50° C. The average boiling point X2 is preferably from −6 to 35° C., more preferably from 0 to 25° C. When the average boiling point X2 is excessively low, the thermal conductivity of the mixed gas tends to be high. Furthermore, since the foaming rate of the phenol resin becomes excessively high, breakage of cells is induced on foaming, and thus, the thermal insulation performance tends to deteriorate. When the average boiling point X2 is excessively high, the thermal insulation performance tends to be deteriorated at a low temperature, particularly at 10° C. because the hydrocarbon becomes likely to be liquefied under low temperatures. It is preferable that the hydrocarbon having 6 or less carbon atoms comprise 5 to 100 mol % of pentanes in total and 0 to 95 mol % of one or two or more selected from hydrocarbons having the boiling point of −50° C. to 5° C. based on the total amount of the hydrocarbon, it is more preferable that the hydrocarbon comprise 10 to 75 mol % of pentanes in total and 25 to 90 mol % of one or two or more selected from hydrocarbons having the boiling point of −50° C. to 5° C., and it is still more preferable that the hydrocarbon comprise 20 to 60 mol % of pentanes in total and 40 to 80 mol % of one or two or more selected from hydrocarbons having the boiling point of −50° C. to 5° C.

The phenol resin foam is obtained by foaming and heat-curing a foamable phenol resin composition that comprises, for example, a phenol resin, a curing catalyst for the resin, a foaming agent composed of a hydrocarbon having 6 or less carbon atoms and a halogenated hydroolefin, and a surfactant.

A phenol resin is obtained by heating, for example, phenol and formaldehyde as raw material with an alkali catalyst in the temperature range of 40 to 100° C. to polymerize the phenol and formaldehyde. Additives such as urea may be added on polymerization of the phenol resin as required. In the case where urea is added, it is more preferable that urea that has been methylolated with an alkali catalyst in advance be mixed in the phenol resin. Since the phenol resin after synthesis usually comprises excess water, even the foamable water amount is dehydrated. The water content in the phenol resin may be 1% by mass or more and 20% by mass or less, is preferably 1% by mass or more and 15% by mass or less, particularly preferably 2% by mass or more and 10% by mass or less.

In the phenol resin foam of the present embodiment, it is preferable that the phenol resin have urea bonds. Urea bonds can be suitably contained by adding urea as an additive on polymerizing the phenol resin in the aforementioned method. The amount of urea to be added as an additive on polymerization of the phenol resin in the present embodiment is preferably from 1.0% by mass to 20.0% by mass, more preferably from 2.0% by mass to 16.0% by mass, still more preferably from 2.0% by mass to 12.0% by mass, particularly preferably from 3.0% by mass to 12.0% by mass, especially preferably from 3.5% by mass to 11.0% by mass, and most preferably from 4.0% by mass to 10.0% by mass, based on the phenol resin. When the amount of urea in the phenol resin is excessively small, the reactivity of the phenol resin increases, and the amount of the heat generated during foaming becomes excessively large. Thus, the internal pressure of the cells on foaming increases and tends to break the cell membrane. Since the brittleness of the phenol resin deteriorates and the foam becomes brittle, the foam is likely to fracture on transportation and construction. In contrast, when the amount of urea is excessively large, the reactivity of the phenol resin is significantly reduced, and the amount of the heat generated during foaming becomes insufficient. Accordingly, the amount of the foaming agent to be required becomes large, and thus, the amount of the foaming agent to be contained in the cells tends to become excessively large.

The starting molar ratio of phenols to aldehydes in the phenol resin is preferably from 1:1 to 1:4.5, more preferably in the range from 1:1.5 to 1:2.5. Examples of the phenols preferably used on phenol resin synthesis include phenols or compounds having a phenol skeleton. Examples of the compound having a phenol skeleton include resorcinols, catechols, ortho-, meta-, and para-cresols, xylenols, ethylphenols, and para-tert butylphenol. As the phenols, it is possible to also use binuclear phenols.

Examples of the aldehyde used for manufacturing the phenol resin include formaldehyde, paraformaldehyde, or aldehyde compounds other than formaldehyde. Examples of the aldehyde compounds other than formaldehyde include glyoxal, acetaldehyde, chloral, furfural, and benzaldehyde.

It is preferable that the viscosity of the phenol resin be 5000 mPa·s or more and 100000 mPa·s or less at 40° C. The viscosity of the phenol resin is more preferably 7000 mPa·s or more and 50000 mPa·s or less, particularly preferably 7000 mPa·s or more and 30000 mPa·s or less, from the viewpoint of increase in the closed cell ratio and reduction in the average cell diameter. When the viscosity of the phenol resin is excessively low, the foaming rate becomes high relatively to the viscosity of the phenol resin, the phenol resin is easily extended by a foaming pressure, and thus, the cell diameter tends to become excessively large. Moreover, the cell membrane is easily broken by the foaming pressure, and thus, there is a tendency to result in deterioration of the closed cell ratio. In contrast, when the viscosity of the phenol resin is excessively high, the viscosity of the phenol resin is excessively high relative to the foaming rate inversely, the foaming rate becomes relatively low, and thus, there is a tendency to fail to achieve a necessary foaming ratio.

The phenol resin composition may include additives, and, for example, it is possible to use a phthalate ester and a glycol such as ethylene glycol and diethylene glycol commonly used as a plasticizer. As the additives, an aliphatic hydrocarbon, an alicyclic hydrocarbon of a high boiling point, or a mixture thereof may be used. It is desirable that the content of the additives be 0.5 parts by mass or more and 20 parts by mass or less based on 100 parts by mass of the phenol resin. When these additives are excessively added, the viscosity of the phenol resin is significantly reduced, and there is a tendency to induce breakage of cells on foaming and curing. When the amount of the additives is excessively small, the significance of inclusion of the additives is decreased. Accordingly, the content of the additives is more preferably 1.0 part by mass or more and 10 parts by mass or less based on 100 parts by mass of the phenol resin.

As the surfactant, those commonly used for manufacturing phenol resin foams can be used. As the surfactant, among these, nonionic surfactants are effective. For example, alkylene oxides, which are copolymers of ethylene oxide and propylene oxide, condensation products of alkylene oxide and castor oil, condensation products of alkylene oxide and alkylphenol such as nonylphenol and dodecylphenol, polyoxyethylene alkyl ethers of 14-22 carbon atoms in the alkyl ether moiety, and additionally fatty acid esters such as polyoxyethylene fatty acid esters, silicone compounds such as polydimethylsiloxane, and polyalcohols are preferable. These surfactants may be used singly or two or more of these may be used in combination. The amount used is not particularly limited, but is preferably used in the range of 0.3 to 10 parts by mass based on 100 parts by mass of the phenol resin.

As the curing catalyst, acidic curing catalysts that can cure phenol resins may be used, but anhydrous acid curing catalysts are preferable. As the anhydrous acid curing catalyst, anhydrous phosphoric acid and anhydrous aryl sulfonic acids are preferable. Examples of the anhydrous aryl sulfonic acid include toluenesulfonic acid, xylenesulfonic acid, phenolsulfonic acid, substituted phenolsulfonic acids, xylenolsulfonic acid, substituted xylenolsulfonic acids, dodecylbenzenesulfonic acid, benzenesulfonic acid, and naphthalenesulfonic acid. As the anhydrous aryl sulfonic acid, these may be used singly, or two or more of these may be combined. As the curing aid, resorcinol, cresol, saligenin (ortho-methylolphenol), para-methylolphenol, and the like may be added. These curing catalysts may be diluted with a solvent such as ethylene glycol and diethylene glycol. The amount of the curing agent used is not particularly limited, but is preferably used in the range of 3 to 30 parts by mass based on 100 parts by mass of the phenol resin.

It is possible to obtain a foamable phenol resin composition by mixing the above phenol resin, curing catalyst, foaming agent, and surfactant in the aforementioned proportion. It is possible to obtain a phenol resin foam by foaming and curing the obtained foamable phenol resin composition as described below.

It is possible to obtain the phenol resin foam by, for example, continuously discharging the aforementioned foamable phenol resin composition onto a running face material, covering a surface of the foamable phenol resin composition, opposite to the surface in contact with the face material, with other face material, and foaming and heat-curing the foamable phenol resin composition sandwiched between the face materials.

It is preferable that the face material sandwiching the above phenol resin foam have flexibility for the purpose of preventing breakage of the face materials on production. Examples of the face material having flexibility include synthetic fiber non-woven fabrics, synthetic fiber woven fabrics, glass fiber paper, glass fiber woven fabrics, glass fiber non-woven fabrics, glass fiber mixed paper, paper, metal films, or combinations thereof. These face materials may contain a flame retardant in order to impart flame retardancy. As the flame retardant, for example, bromine compounds, such as tetrabromobisphenol A and decabromodiphenyl ether, phosphorus or phosphorus compounds, such as aromatic phosphoric esters, aromatic condensed phosphoric esters, halogenated phosphoric esters, and red phosphorus, antimony compounds, such as ammonium polyphosphate, antimony trioxide, and antimony pentoxide, and metal hydroxides, such as aluminum hydroxide and magnesium hydroxide, which are generally used, can be used. These flame retardants may be kneaded in face material fiber, or may be added to a binder, such as acryl, polyvinyl alcohol, vinyl acetate, epoxy, and unsaturated polyester. It is possible to surface-treat the face material with a water repellent, such as fluorine-resin, silicone-resin, wax-emulsion, paraffin, and acryl-resin paraffin wax-combined water repellents, and asphalt waterproofing agents. These water repellents and waterproofing agents may be used singly, or the above flame retardants may be added to them and applied on the face material.

It is preferable that the face material be a highly gas-permeable face material. As such face materials, synthetic fiber non-woven fabrics, glass fiber paper, glass fiber non-woven fabrics, paper, pre-perforated metal films and the like are suitably used. Among such face materials, a face material of which the oxygen permeability, which is measured as a gas permeability in compliance with ASTM D3985-95, is 4.5 cm$^3$/24 h·m$^2$ or more is particularly preferable. In the case where a face material of which the gas permeability is low is used, it is not possible to dissipate the moisture generated when the phenol resin is cured, and the moisture is likely to remain in the foam. Thus, a foam of which the closed cell ratio is low and in which there are many voids is provided, and the foam tends to fail to maintain good thermal insulation performance over a long period. From the viewpoint of leaching of the foamable phenol resin composition on foaming to the face material and adhesion of the foamable phenol resin composition to the face material, in the case where a synthetic fiber non-woven fabric is used as the face material, the weight per unit area is preferably from 15 to 200 g/m$^2$, more preferably from 15 to 150 g/m$^2$, still more preferably from 15 to 100 g/m$^2$, particularly preferably from 15 to 80 g/m$^2$, and most preferably from 15 to 60 g/m$^2$. In the case where a glass fiber non-woven fabric is used, the weight per unit area is preferably from 30 to 600 g/m$^2$, more preferably from 30 to 500 g/m$^2$, still more preferably from 30 to 400 g/m$^2$, particularly preferably from 30 to 350 g/m$^2$, and most preferably from 30 to 300 g/m$^2$.

It is possible to allow the foam phenol resin composition sandwiched between the two face materials to be foamed between the two face materials. In order to cure this foamed phenol resin composition (foam), it is possible to use a first oven and a second oven as follows, for example.

The first oven generates hot air from 60 to 110° C. and may have an endless steel belt-type double conveyor or a slat-type double conveyor. In this oven, it is possible to obtain a partially-cured foam by curing an uncured foam while molding the foam into a plate. The interior of the first oven may not be at a uniform temperature over its whole area, and may have a plurality of temperature zones.

It is preferable that the second oven be an oven that generates hot air from 70 to 120° C. and post-cures the partially-cured foam from the first oven. Partially-cured foam boards may be stacked at a certain interval using spacers or trays. When the temperature in the second oven is excessively high, the pressure of the foaming agent inside cells of the foam becomes excessively high, and thus, there is a possibility of inducing breakage of the foams. When the temperature is excessively low, there is a possibility of taking an excessively long time to allow the reaction of the phenol resin to proceed. Accordingly, it is more preferable that the temperature in the second oven be from 80 to 110° C.

The density of the phenol resin foam in the present embodiment is 10 kg/m$^3$ or more and 150 kg/m$^3$ or less, preferably 15 kg/m$^3$ or more and 70 kg/m$^3$ or less, more preferably 15 kg/m$^3$ or more and 40 kg/m$^3$ or less, still more preferably 15 kg/m$^3$ or more and 30 kg/m$^3$ or less, and most preferably 20 kg/m$^3$ or more and 28 kg/m$^3$ or less. When the density is less than 10 kg/m$^3$, the strength is weak, and the foam becomes difficult to handle. Since cell walls are thin, the foaming agent in the foam is likely to be replaced with air, and furthermore, the cell walls are likely to be broken on foaming to thereby fail to maintain the closed-cell structure. In both cases, the long-term thermal insulation performance tends to be reduced. When the density is excessively higher than 150 kg/m$^3$, the thermal conductivity of a resin portion forming cell walls becomes larger, and thus the thermal insulation performance tends to be reduced.

The average cell diameter in the present embodiment may be 40 μm or more and 300 μm or less, preferably 50 μm or more to 200 μm, still more preferably 50 μm or more to 150 μm, and 60 μm or more to 110 μm is particularly preferable. When the average cell diameter is excessively large, gas convection in the cells and heat insulation by the cell membranes become reduced, and thus, the initial thermal insulation performance tends to deteriorate. In contrast, when the average cell diameter is excessively small, each cell membrane becomes thinner, and thus, the compression strength tends to be reduced.

The method for foaming and curing the foamable phenol resin composition to obtain the phenol resin foam of the present embodiment is not limited to the aforementioned method.

In accordance with the above manufacturing method according to the present embodiment, it is possible to provide a phenol foam of which the environmental load is small, of which the initial thermal insulation performance is excellent, and of which the change over time is small over a long period.

EXAMPLES

Hereinbelow, the present invention will be described more specifically based on Examples and Comparative Examples, but the present invention is not limited by the Examples below.

The compositions, structures, and properties of the phenol resins and phenol resin foams in Examples and Comparative Examples were measured and evaluated with respect to following items.

(1) Foam Density

A 20-cm square board cut from an obtained phenol resin foam was used as a specimen. The foam density is a value obtained by measuring the mass and apparent volume of the specimen from which surface material such as a face material and a siding material had been removed, and was measured in accordance with JIS-K-7222.

(2) Average Cell Diameter

The average cell diameter was measured in the following method with reference to the method described in YES-K-6402.

A cutting surface obtained by cutting the substantial center of a phenol resin foam in the thickness direction in parallel with the front and back surfaces was photographed at a magnification of 50. On the obtained photograph, four straight lines of a length of 9 cm (corresponding to 1800 μm in the actual foam cross-sectional surface) were drawn, and an average value of the number of cells that each straight line crossed was determined. The average cell diameter is a value determined by dividing 1800 μm by the average value of the number of cells on which each straight line crossed.

(3) Closed Cell Ratio

The closed cell ratio was measured in the following method with reference to Method A in ASTM-D-2856-94 (1998).

An about 25-mm square cubic test specimen was cut out from the center part in the thickness direction of the phenol resin foam. When it was not possible to obtain a test specimen of which the uniform thickness is 25 mm due to its thin thickness, every surface of the about 25-mm square cubic test specimen cut out was sliced by about 1 mm, and a test specimen having a uniform thickness was used. The length of each side was measured with a caliper, and the apparent volume (V1: cm$^3$) was determined as well as the mass (W: four significant digits, g) of the test specimen was measured. Subsequently, a closed space volume (V2: cm$^3$) of the test specimen was measured with an air pycnometer (Tokyoscience Co, Ltd., trade name "MODEL 1000") in accordance with the method described in Method A in ASTM-D-2856.

The cell diameter (t: cm) was measured in accordance with the measurement method in "(2) Average Cell Diameter" aforementioned, and the surface area (A: cm$^3$) of the test specimen was determined from the length of each side previously measured. From t and A, the opening cell volume (VA: cm$^3$) of cut cells on the test specimen surface was calculated by the expression VA=(A×t)/1.14. The density of the solid phenol resin was set to 1.3 g/ml, and the solid portion volume (VS: cm$^3$) constituting the cell walls contained in the test specimen was calculated by the expression VS=Test specimen mass (W)/1.3.

The closed cell ratio was calculated by the following expression (2):

$$\text{Closed cell ratio (\%)} = [(V2-VS)/(V1-VA-VS)] \times 100 \qquad (2)$$

The foam samples of the same manufacture conditions were measured 6 times, and the average value was used as the representative value of the manufacture condition sample.

(4) Void Area Ratio

A photograph or color copy of a 100 mm×150 mm area of the cut cross section obtained by cutting the substantial center of a phenol resin foam sample in the thickness direction in parallel with the front and back surfaces and magnified to 200% was taken. In the photograph or copy drawing taken, each of the vertical and horizontal lengths corresponds to two times the actual dimension, and the area corresponds to four times the actual area. A transparent section paper was overlapped on the photograph or drawing, a large-diameter cell was selected, and the cross-sectional area of the cell was measured using grids in the section paper. A pore in which eight or more of 1 mm×1 mm squares or more existed in sequence was determined as a void, and the observed void areas were integrated to calculate the area fraction. In other words, these eight squares correspond to an area of 2 mm$^2$ in the cross section of the actual foam because the enlarged copy was made. The specimens of the same manufacture conditions were measured 12 times, and the average value was used as a representative value of the manufacture condition sample.

(5) Initial Thermal Conductivity

The initial thermal conductivities at 10° C. and 23° C. were measured in the following method in compliance with JIS A 1412-2: 1999.

The phenol resin foam sample was cut into an about 600 mm square, the test specimen was placed in an atmosphere at 23±1° C. and a humidity of 50±2%, and change in the mass over time was measured every 24 hours. The test specimen was conditioned until the change in the mass over 24 hours reached 0.2% by mass or less. The test specimen conditioned was introduced into a thermal conductivity meter placed in the same environment.

Thermal conductivity measurement was conducted, after the face material was peeled without damaging the foamed portion, under conditions of a lower temperature plate of 0° C. and a higher temperature plate of 20° C. for the initial thermal conductivity at 10° C. and under conditions of a lower temperature plate of 13° C. and a higher temperature plate of 33° C. for the initial thermal conductivity at 23° C., using a measurement apparatus of a single test specimen-symmetric configuration system (EKO Instruments, trade name "HC-074/600").

(6) Thermal Conductivity after Acceleration Test

The test specimen of which measurement of the initial thermal conductivity was finished was placed in a circulation oven of which the temperature was adjusted to 110° C. for 14 days and subjected to acceleration test in accordance with EN 13166: 2012, Annex C, C. 4. 2. 2. After then, in accordance with EN 12429:1998, the test specimen was cured at 23±2° C. and a relative humidity of 50±5% and conditioned until the difference of weight measurements conducted at intervals of 24 hours reached 0.05% or less of the weight. Subsequently, in accordance with the measurement method of the aforementioned (5) Thermal Conductivity, measurement of thermal conductivity after acceleration test was conducted at 10° C.

(7) Phenol Resin Water Content

To dehydrated methanol (manufactured by Kanto Chemical Co., Ltd.) of which the water amount was measured, the phenol resin was dissolved in a range of 3% by mass to 7% by mass. The water amount of the phenol resin was determined by subtracting the water amount in the dehydrated methanol from the water amount of the solution. The water content of the phenol resin was calculated from the water amount measured. The Karl-Fischer moisture meter (manufactured by Kyoto Electronics Manufacturing Co., Ltd., MKC-510) was used for the measurement. For the measurement of the water amount, HYDRANAL-Composite 5K manufactured by Sigma-Aldrich was used as the Karl-Fischer reagent, and HAYASHI-Solvent CE dehydrated solvent manufactured by Hayashi Pure Chemical Inc., Ltd. (for ketone) for Karl-Fischer titration was used. For measurement of the titer of the Karl-Fischer reagent, AQUAMICRON standard water-methanol (water amount 2 mg) manufactured by Mitsubishi Chemical Corporation was used. The water amount measurement was determined by Method 1, and the titer of the Karl-Fischer reagent was determined by Method 5, set in the apparatus.

(8) Water Amount in Solid

The water amount vaporized by heating at 110° C. was measured with a Karl-Fischer moisture meter having a boat-type moisture vaporization device.

(9) Composition Ratio among Hydrocarbon having 6 or Less Carbon Atoms, Halogenated Hydroolefin, and Hydrocarbon Having the Boiling Point of −50 to 5° C. Contained in Foam First, the retention time under the following GC/MS measurement conditions was determined using a standard halogenated hydroolefin gas.

Subsequently, 10 g of a phenol resin foam sample from which the face material was peeled off and a metal file were placed and sealed in a 10 L container (product name Tedlar Bag), into which 5 L of nitrogen was injected. The specimen was ground and finely pulverized using the file over the Tedlar Bag. Subsequently, the Tedlar Bag was placed in a temperature controller in which the temperature was adjusted to 81° C. for 10 minutes. One hundred microliters of the gas generated in the Tedlar Bag was collected and analyzed under the GC/MS measurement conditions shown below. The type of halogenated hydroolefin was identified from the retention time determined in advance and the mass spectrum. As for the hydrocarbon having 6 or less carbon atoms and the hydrocarbon having the boiling point of −50 to 5° C., their types were determined by the retention time and the mass spectrum.

Separately, the detection sensitivities of the generated gas components were measured using each standard gas, and the composition ratio was calculated from the detected area and detection sensitivity of each gas component obtained from the above GC/MS.

GC/MS Measurement Conditions

The GC/MS measurement was conducted as follows. As the gas chromatography, Agilent 7890 type manufactured by Agilent Technologies, Inc. was used, and as the column, InertCap 5 (inner diameter 0.25 mm, membrane thickness 5 μm, and length 30 m) manufactured by GL Sciences Inc. was used. As the carrier gas, helium was used, and the flow rate was set to 1.1 ml/minute. The temperature at the injection port was 150° C., the injection method was the split method (1:50), and the amount of the specimen injected was 100 μL. The column temperature was retained at −60° C. for 5 minutes first, and then, raised at 50° C./minute to 150° C. and retained for 2.8 minutes. For mass spectrometry, Q1000GC type manufactured by JEOL Ltd. was used. Mass spectrometry was conducted under conditions of ionization method: electron ionization method (70 eV), scan range: m/Z=10 to 500, voltage: −1300 V, ion source temperature: 230° C., and interface temperature: 150° C.

(10) Content of Hydrocarbon having 6 or Less Carbon Atoms and Content of Halogenated Hydroolefin in Foam The phenol resin foam sample was cut into about 100 mm squares to prepare 6 test specimen, as well as 6 sealable zipper bags having heat resistance (hereinafter, abbreviated as zipper bags) were provided, and the mass of each bag was measured with a precision balance. The test specimen was placed in a circulation oven in which the temperature was adjusted to 70° C. for 24±0.5 hours to disperse the moisture contained, and thereafter the test specimen was immediately placed in a zipper bag, sealed, and cooled to room temperature. After being cooled to room temperature, the test specimen was taken out from the zipper bag, and the face material of the test specimen was immediately peeled off, as well as the mass (W1) of each test specimen was measured with the precision balance. The length of each side was measured with a caliper to calculate the volume (V) of the specimen. Then, each specimen was placed back in the zipper bag, which was sealed again with a part of the opening left open, inserted between the plates of a hydraulic press at room temperature and gradually compressed to a pressure of about 200 N/cm² to thereby break the cells in the test specimen. A portion of the test specimen was collected from three test specimens, and the water amount (WS1) contained was measured by the method for measuring the water amount in the solid as described above. As for the remaining test specimens, the zipper bags with the part of the opening left open were placed in a circulation oven in which the temperature was adjusted to 81° C. for 30±5 minutes. Then, the gas in the bag was immediately discharged so as not to allow the powder to go out of the bag, and the bag was sealed and cooled to room temperature. After cooled to room temperature, the mass of the zipper bag in which the test specimen not subjected to the water content measurement in the above was placed was measured with a precision balance, and the mass of the zipper bag was subtracted to determine the mass (W2) of the test specimen from which volatile components were removed. At the same time, a portion of the test specimen was collected from the bags of the three specimens for which the water content was measured as described above, and the water amount (WS2) was measured in a similar manner.

As for the mass of the hydrocarbon having 6 or less carbon atoms and the halogenated hydroolefin in the foam, a volatile component mass (W3) was determined by subtracting the difference between the above water amount from the difference between W1 and W2 as well as by adding an air buoyancy mass (WF) calculated from a volume (space volume in the foam) determined by subtracting a resin volume calculated from W2 with setting the solid phenol resin density to 1.3 g/cm³ from the specimen volume (V) and the density of air (0.00119 g/mL). W3 was multiplied by each ratio in the gas component of the hydrocarbon having 6 or less carbon atoms, the halogenated hydroolefin, and the hydrocarbon of −50° C. to 5° C. measured in the above (9) to calculate each mass (W4), (W5), and (W6).

W3 is represented by the following expression:

$$W3=(W1-W2)-(WS1-WS2)+WF$$

The content of the hydrocarbon having 6 or less carbon atoms and of the halogenated hydroolefin in the foam (mol/22.4×10⁻³ m³) was calculated from the mass of each gas W4 and W5, V calculated in the corresponding (10), and the molecular weights of the hydrocarbon having 6 or less carbon atoms and the halogenated hydroolefin measured in the above (9).

(11) The mol ratios of the pentanes of 6 or less carbon atoms and the hydrocarbon having the boiling point of −50 to 5° C. was calculated from W4 and W6 determined in the above (10) and each gas molecular weight of each gas calculated in the above (9).

(12) Viscosity of Phenol Resin

The viscosity of the phenol resin was a measurement value after stabilization for 3 minutes at 40° C. using a rotation viscometer (manufactured by Toki Sangyo Co., Ltd., Type R-100, rotor part: 3°XR-14). The viscosity of the foamable phenol resin composition on molding into a plate was a measurement value after 3 minutes had passed at 40° C. using the rotation viscometer, in order to evaluate the viscosity with elimination of the viscosity increase effect due to curing of the resin as much as possible.

(13) Presence or Absence of Urea Trapped in Phenol Resin Crosslinked Structure

About 500 mg was cut out from near the center in the thickness direction of the phenol resin foam and cryogenically crushed for 5 minutes using a cryogenic sample crusher "JFC-2000" manufactured by Japan Analytical Industry Co., Ltd. The total amount of the crushed specimen was placed in a sealed container, to which 50 ml of a mixed solution of 1:1 methanol (manufactured by Wako Pure Chemical Industries, Ltd., for spectrometry) and distilled water was added. Subsequently, this solution was stirred for 4 hours, and then, left immersed overnight. This solution was centrifuged in a centrifuge at 5000 rpm for 5 minutes. After the supernatant was discarded, 200 ml of the above methanol was further added to the insoluble and centrifuged in a centrifuge at 5000 rpm for 5 minutes. After the supernatant was discarded, the insoluble was air-dried to obtain a test specimen for IR measurement. An appropriate amount of the test specimen for IR measurement was placed on a Ge specimen stage and IR measurement was conducted. The IR measurement was conducted with the following apparatus under the following conditions.

Measurement apparatus: Nicolet iS50/Continuum (Manufactured by Thermo Fisher Scientific Inc.)
Measurement Method: Transmission Method
Resolution: 8 cm⁻¹
Aperture size: 70 μm From the IR spectrum obtained, in the case where a peak around 1640 cm⁻¹, attributed to the (C=O) stretching vibration (vC=O) derived from urea, and a peak around 1540 cm⁻¹, attributed to the bending vibration (δN—H) of secondary amide (—NHR) were observed, it was determined that there was urea trapped by the bond.

Example 1

Synthesis of Phenol Resin

To a reactor, 3500 kg of 52% by mass formaldehyde aqueous solution and 2510 kg of 99% by mass phenol were placed, and the mixture was stirred with a propeller rotating stirrer. The temperature of the liquid inside the reactor was adjusted to 40° C. with a temperature controller. Then, the temperature was raised to conduct the reaction, while 50% by mass aqueous sodium hydroxide solution was added until the pH of the reaction solution reached 8.7. At the phase where the Ostwald viscosity reached 60 centistokes (=60× 10⁻⁶ m²/s, a measured value at 25° C.), the reaction liquid was cooled, and 570 kg of urea was added. Thereafter, the reaction liquid was cooled to 30° C., and 50% by mass p-toluenesulfonic acid monohydrate aqueous solution was added until the pH of the reaction liquid reached 6.4. As the result of concentrating the reaction liquid obtained by a thin film evaporator, Phenol resin A was obtained, and its water content was 4.2% by mass.

Based on 100 parts by mass of Phenol resin A, 2.0 parts by mass of a composition containing 50% by mass of a block copolymer of ethyleneoxide-propyleneoxide and 50% by mass of polyoxyethylene dodecyl phenyl ether, in mass ratio, as a surfactant was mixed. Based on 100 parts by mass of the phenol resin into which the above surfactant was mixed, 7 parts by mass of a mixture comprising 50 mol % of isopentane and 50 mol % of 1-chloro-3,3,3-trifluoropropene, in mol ratio, as a foaming agent, and 14 parts by mass of a composition comprising a mixture of 80% by mass of xylene sulfonic acid and 20% by mass of diethylene glycol as an acid curing catalyst were mixed with a mixing head of which the temperature was adjusted to 25° C., and supplied onto a moving face material.

The foamable phenol resin composition supplied onto the face material was introduced into a first oven having a slat-type double conveyor heated to 85° C. so as to be sandwiched between two face materials, while a surface opposite to the surface in contact with the face material was covered with other face material. After cured for 15 minutes of a retention time, the foamable phenol resin composition was cured in a 110° C. oven for 2 hours to be a phenol resin foam.

As the face material, glass fiber non-woven fabric ("Dura-Glass Type DH70" manufactured by Johns-Manville Corporation, basis weight: 70 g/m$^2$) was used.

Example 2

A phenol resin foam was obtained in the same manner as in Example 1 except that a mixture of 40 mol % of cyclopentane and 60 mol % of 1-chloro-3,3,3-trifluoropropene, in mol ratio, was used as the foaming agent.

Example 3

A phenol resin foam was obtained in the same manner as in Example 1 except that a mixture of 20 mol % of cyclopentane and 80 mol % of 1-chloro-3,3,3-trifluoropropene, in mol ratio, was used as the foaming agent and that 10 parts of the foaming agent was added based on 100 parts by mass of the phenol resin to which the surfactant had been mixed.

Example 4

A phenol resin foam was obtained in the same manner as in Example 1 except that a mixture of 50 mol % of cyclopentane and 50 mol % of 1-chloro-3,3,3-trifluoropropene, in mol ratio, was used as the foaming agent, that 4 parts of the foaming agent was added based on 100 parts by mass of the phenol resin to which the surfactant had been mixed, and that the temperature of the first oven was set to 90° C.

Example 5

A phenol resin foam was obtained in the same manner as in Example 1 except that a mixture of 50 mol % of cyclopentane and 50 mol % of 1-chloro-3,3,3-trifluoropropene, in mol ratio, was used as the foaming agent, that 10 parts of the foaming agent was added based on 100 parts by mass of the phenol resin to which the surfactant had been mixed, and that the temperature of the first oven was set to 75° C.

Example 6

A phenol resin foam was obtained in the same manner as in Example 1 except that a mixture of 10 mol % of cyclopentane and 90 mol % of 1-chloro-3,3,3-trifluoropropene, in mol ratio, was used as the foaming agent, that 14 parts of the foaming agent was added based on 100 parts by mass of the phenol resin to which the surfactant had been mixed, and that the temperature of the first oven was set to 70° C.

Example 7

A phenol resin foam was obtained in the same manner as in Example 1 except that a mixture of 85 mol % of cyclopentane and 15 mol % of 1-chloro-3,3,3-trifluoropropene, in mol ratio, was used as the foaming agent, that 10 parts of the foaming agent was added based on 100 parts by mass of the phenol resin to which the surfactant had been mixed, and that the temperature of the first oven was set to 75° C.

Example 8

A phenol resin foam was obtained in the same manner as in Example 1 except that a mixture of 85 mol % of cyclopentane and 15 mol % of 1-chloro-3,3,3-trifluoropropene, in mol ratio, was used as the foaming agent and that 6 parts of the foaming agent was added based on 100 parts by mass of the phenol resin to which the surfactant had been mixed.

Example 9

A phenol resin foam was obtained in the same manner as in Example 1 except that a mixture of 4 mol % of cyclopentane, 11 mol % of isobutane, and 85 mol % of 1-chloro-3,3,3-trifluoropropene, in mol ratio, was used as the foaming agent, that 10 parts of the foaming agent was added based on 100 parts by mass of the phenol resin to which the surfactant had been mixed, and that the temperature of the first oven was set to 80° C.

Example 10

A phenol resin foam was obtained in the same manner as in Example 1 except that a mixture of 75 mol % of cyclopentane, 14 mol % of isobutane, and 11 mol % of 1-chloro-3,3,3-trifluoropropene, in mol ratio, was used as the foaming agent.

Example 11

A phenol resin foam was obtained in the same manner as in Example 1 except that a mixture of 49 mol % of cyclopentane, 17 mol % of isobutane, and 34 mol % of 1-chloro-3,3,3-trifluoropropene, in mol ratio, was used as the foaming agent.

Comparative Example 1

A phenol resin foam was obtained in the same manner as in Example 1 except that the foaming agent used was 100 mol % of 1-chloro-3,3,3-trifluoropropene.

Comparative Example 2

A phenol resin foam was obtained in the same manner as in Example 1 except that a mixture of 75 mol % of cyclopentane, 12 mol % of isobutane, and 13 mol % of 1-chloro-3,3,3-trifluoropropene, in mol ratio, was used as the foaming agent, that 4 parts of the foaming agent was added based on 100 parts by mass of the phenol resin to which the surfactant had been mixed, and that the temperature of the first oven was set to 95° C.

Comparative Example 3

A phenol resin foam was obtained in the same manner as in Example 1 except that a mixture of 85 mol % of cyclopentane and 15 mol % of 1-chloro-3,3,3-trifluoropropene, in mol ratio, was used as the foaming agent, that 10 parts of the foaming agent was added based on 100 parts by mass of the phenol resin to which the surfactant had been mixed, and that the temperature of the first oven was set to 70° C.

The content of the foaming agent per $22.4 \times 10^{-3}$ m$^3$ (22.4 L) spatial volume in the phenol resin foam obtained in the above Examples 1 to 11 and Comparative Examples 1 to 3, the average boiling points X1 and X2, the properties and thermal conductivity evaluation results of the phenol resin foams obtained are shown in Table 1.

TABLE 1

|  | Example 1 | Example 2 | Example 3 | Example 4 | Example 5 | Example 6 | Example 7 |
| --- | --- | --- | --- | --- | --- | --- | --- |
| Foaming agent | Isopentane/ 1-chloro-3,3,3-trifluoropropene | Cyclopentane/ 1-chloro-3,3,3-trifluoropropene | Cyclopentane/ 1-chloro-3,3,3-trifluoropropene | Cyclopentane/ 1-chloro-3,3,3-trifluoropropene | Cyclopentane/ 1-chloro-3,3,3-trifluoropropene | Cyclopentane/ 1-chloro-3,3,3-trifluoropropene | Cyclopentane/ 1-chloro-3,3,3-trifluoropropene |
| First oven temperature (° C.) | 85 | 85 | 85 | 90 | 75 | 70 | 75 |
| Total amount of hydrocarbon of 6 or less hydrocarbons and 1-chloro-3,3,3-trifluoropropene (mol/22.4 L) | 0.54 | 0.57 | 0.55 | 0.27 | 0.88 | 0.86 | 0.88 |
| Content of hydrocarbon having 6 or less carbon atoms (mol/22.4 L) | 0.26 | 0.22 | 0.09 | 0.13 | 0.44 | 0.08 | 0.75 |
| Content of 1-chloro-3,3,3-trifluoropropene (mol/22.4 L) | 0.28 | 0.35 | 0.46 | 0.14 | 0.44 | 0.78 | 0.13 |
| Average boiling point of hydrocarbon of 6 or less hydrocarbons and 1-chloro-3,3,3-trifluoropropene, X1 (° C.) | 23.3 | 30.4 | 24.1 | 33.4 | 34.0 | 21.8 | 44.5 |
| Average boiling point of hydrocarbon of 6 or less hydrocarbons, X2 (° C.) | 28 | 49.0 | 49.0 | 49.0 | 49.0 | 49.0 | 49.0 |
| Foam thickness (mm) | 50.8 | 50.2 | 50.4 | 48.8 | 50.8 | 51.2 | 50.6 |
| Foam density (kg/m$^3$) | 28.2 | 27.6 | 27.4 | 33.6 | 27.2 | 26.8 | 27.4 |
| Closed cell ratio (%) | 96.2 | 97.1 | 96.3 | 92.1 | 91.8 | 90.2 | 92.0 |
| Average cell diameter (μm) | 112 | 118 | 126 | 108 | 126 | 138 | 120 |
| Void area proportion (%) | 0.06 | 0.05 | 0.07 | 0.04 | 0.07 | 0.13 | 0.06 |
| Presence or absence of urea trapped in bond | Yes | Yes | Yes | Yes | Yes | Yes | Yes |
| Initial thermal conductivity at 23° C. (W/mk) | 0.0187 | 0.0181 | 0.0177 | 0.0189 | 0.0190 | 0.0182 | 0.0202 |
| Initial thermal conductivity at 10° C. (W/mk) | 0.0186 | 0.0167 | 0.0162 | 0.0180 | 0.0188 | 0.0172 | 0.0204 |

TABLE 1-continued

| Thermal conductivity after acceleration test Measured at 10° C. (W/mk) | 0.0197 | 0.0177 | 0.0173 | 0.0193 | 0.0195 | 0.0188 | 0.0197 |
| --- | --- | --- | --- | --- | --- | --- | --- |

|  | Example 8 | Example 9 | Example 10 | Example 11 | Comparative Example 1 | Comparative Example 2 | Comparative Example 3 |
| --- | --- | --- | --- | --- | --- | --- | --- |
| Foaming agent | Cyclopentane/ 1-chloro-3,3,3-trifluoro-propene | Cyclopentane/ isobutane/ 1-chloro-3,3,3-trifluoro-propene | Cyclopentane/ isobutane/ 1-chloro-3,3,3-trifluoro-propene | Cyclopentane/ isobutane/ 1-chloro-3,3,3-trifluoro-propene | 1-chloro-3,3,3-trifluoro-propene | Cyclopentane/ isobutane/ 1-chloro-3,3,3-trifluoro-propene | Cyclopentane/ 1-chloro-3,3,3-trifluoro-propene |
| First oven temperature (° C.) | 85 | 80 | 85 | 85 | 85 | 95 | 70 |
| Total amount of hydrocarbon of 6 or less hydrocarbons and 1-chloro-3,3,3-trifluoropropene (mol/22.4 L) | 0.60 | 0.52 | 0.54 | 0.52 | 0.52 | 0.22 | 0.92 |
| Content of hydrocarbon having 6 or less carbon atoms (mol/22.4 L) | 0.51 | 0.08 | 0.48 | 0.34 | 0.00 | 0.19 | 0.78 |
| Content of 1-chloro-3,3,3-trifluoropropene (mol/22.4 L) | 0.09 | 0.44 | 0.06 | 0.18 | 0.52 | 0.03 | 0.14 |
| Average boiling point of hydrocarbon of 6 or less hydrocarbons and 1-chloro-3,3,3-trifluoropropene, X1 (° C.) | 44.5 | 16.2 | 37.5 | 29.0 | 19 | 37.5 | 44.5 |
| Average boiling point of hydrocarbon of 6 or less hydrocarbons, X2 (° C.) | 49.0 | 0.2 | 40.0 | 34.2 | — | 40.0 | 49.0 |
| Foam thickness (mm) | 48.8 | 51.2 | 49.6 | 50.3 | 48.9 | 50.2 | 47.2 |
| Foam density (kg/m$^3$) | 32.0 | 26.7 | 28.3 | 27.4 | 31.8 | 54.3 | 33.2 |
| Closed cell ratio (%) | 92.3 | 90.3 | 94.3 | 95.6 | 81.3 | 88.6 | 90.2 |
| Average cell diameter (μm) | 103 | 127 | 112 | 121 | 120 | 106 | 103 |
| Void area proportion (%) | 0.04 | 0.08 | 0.05 | 0.05 | 0.08 | 0.05 | 0.10 |
| Presence or absence of urea trapped in bond | Yes | Yes | Yes | Yes | Yes | Yes | Yes |
| Initial thermal conductivity at 23° C. (W/mk) | 0.0191 | 0.0179 | 0.0191 | 0.0188 | 0.0176 | 0.0206 | 0.0204 |

TABLE 1-continued

| Initial thermal conductivity at 10° C. (W/mk) | 0.0202 | 0.0165 | 0.0202 | 0.0190 | 0.0164 | 0.0203 | 0.0211 |
|---|---|---|---|---|---|---|---|
| Thermal conductivity after acceleration test Measured at 10° C. (W/mk) | 0.0198 | 0.0177 | 0.0196 | 0.0197 | 0.0203 | 0.0206 | 0.0207 |

Example 12

Based on 100 parts by mass of Phenol resin A, 2.0 parts by mass of a composition containing 50% by mass of a block copolymer of ethyleneoxide-propyleneoxide and 50% by mass of polyoxyethylene dodecyl phenyl ether, in mass ratio, as a surfactant was mixed. Based on 100 parts by mass of the phenol resin into which the above surfactant was mixed, 7 parts by mass of a mixture comprising 60 mol % of isopentane and 40 mol % of 1,3,3,3-tetrafluoropropene as a foaming agent, in mol ratio, and 14 parts by mass of a composition comprising a mixture of 80% by mass of xylene sulfonic acid and 20% by mass of diethylene glycol as an acid curing catalyst were mixed with a mixing head of which the temperature was adjusted to 25° C., and supplied onto a moving face material.

The foamable phenol resin composition supplied onto the face material was introduced into a first oven having a slat-type double conveyor heated to 80° C. so as to be sandwiched between two face materials, while a surface opposite to the surface in contact with the face material was covered with other face material. After cured for 15 minutes of a retention time, the foamable phenol resin composition was cured in a 110° C. oven for 2 hours to be a phenol resin foam.

As the face material, glass fiber non-woven fabric ("Dura-Glass Type DH70" manufactured by Johns-Manville Corporation, basis weight: 70 g/m$^2$) was used.

Example 13

A phenol resin foam was obtained in the same manner as in Example 12 except that a mixture of 30 mol % of cyclopentane and 70 mol % of 1,3,3,3-tetrafluoropropene, in mol ratio, was used as the foaming agent, that 10 parts of the foaming agent was added based on 100 parts by mass of the phenol resin to which the surfactant had been mixed, and that the temperature of the first oven was set to 70° C.

Example 14

A phenol resin foam was obtained in the same manner as in Example 12 except that a mixture of 50 mol % of cyclopentane and 50 mol % of 1,3,3,3-tetrafluoropropene, in mol ratio, was used as the foaming agent and that the temperature of the first oven was set to 75° C.

Example 15

A phenol resin foam was obtained in the same manner as in Example 12 except that a mixture of 30 mol % of cyclopentane and 70 mol % of 1,3,3,3-tetrafluoropropene, in mol ratio, was used as the foaming agent, that 5 parts of the foaming agent was added based on 100 parts by mass of the phenol resin to which the surfactant had been mixed, and that the temperature of the first oven was set to 90° C.

Example 16

A phenol resin foam was obtained in the same manner as in Example 12 except that a mixture of 90 mol % of cyclopentane and 10 mol % of 1,3,3,3-tetrafluoropropene, in mol ratio, was used as the foaming agent, that 9 parts of the foaming agent was added based on 100 parts by mass of the phenol resin to which the surfactant had been mixed, and that the temperature of the first oven was set to 70° C.

Example 17

A phenol resin foam was obtained in the same manner as in Example 12 except that a mixture of 10 mol % of cyclopentane and 90 mol % of 1,3,3,3-tetrafluoropropene, in mol ratio, was used as the foaming agent, that 14 parts of the foaming agent was added based on 100 parts by mass of the phenol resin to which the surfactant had been mixed, and that the temperature of the first oven was set to 65° C.

Example 18

A phenol resin foam was obtained in the same manner as in Example 12 except that a mixture of 90 mol % of cyclopentane and 10 mol % of 1,3,3,3-tetrafluoropropene, in mol ratio, was used as the foaming agent.

Example 19

A phenol resin foam was obtained in the same manner as in Example 12 except that a mixture of 35 mol % of cyclopentane, 44 mol % of isobutane, and 11 mol % of 1,3,3,3-tetrafluoropropene, in mol ratio, was used as the foaming agent and that the temperature of the first oven was set to 70° C.

Example 20

A phenol resin foam was obtained in the same manner as in Example 12 except that a mixture of 55 mol % of cyclopentane, 13 mol % of isobutane, and 12 mol % of 1,3,3,3-tetrafluoropropene, in mol ratio, was used as the foaming agent.

Example 21

A phenol resin foam was obtained in the same manner as in Example 12 except that a mixture of 75 mol % of cyclopentane and 25 mol % of 1,3,3,3-tetrafluoropropene, in mol ratio, was used as the foaming agent.

Example 22

A phenol resin foam was obtained in the same manner as in Example 12 except that a mixture of 62 mol % of cyclopentane and 38 mol % of 1,3,3,3-tetrafluoropropene, in mol ratio, was used as the foaming agent.

Comparative Example 4

A phenol resin foam was obtained in the same manner as in Example 12 except that the foaming agent used was 100 mol % of 1,3,3,3-tetrafluoropropene Comparative Example 5

A phenol resin foam was obtained in the same manner as in Example 12 except that a mixture of 70 mol % of cyclopentane, 5 mol % of isobutane, and 25 mol % of 1,3,3,3-tetrafluoropropene, in mol ratio, was used as the foaming agent, that 4 parts of the foaming agent was added based on 100 parts by mass of the phenol resin to which the surfactant had been mixed, and that the temperature of the first oven was set to 90° C.

Comparative Example 6

A phenol resin foam was obtained in the same manner as in Example 12 except that a mixture of 88 mol % of cyclopentane and 12 mol % of 1,3,3,3-tetrafluoropropene, in mol ratio, was used as the foaming agent, that 10 parts of the foaming agent was added based on 100 parts by mass of the phenol resin to which the surfactant had been mixed, and that the temperature of the first oven was set to 65° C.

The content of the foaming agent per $22.4 \times 10^{-3}$ m$^3$ (22.4 L) spatial volume in the phenol resin foam obtained in the above Examples 12 to 22 and Comparative Examples 4 to 6, the average boiling points X1 and X2, the properties and thermal conductivity evaluation results of the phenol resin foams obtained are shown in Table 2.

TABLE 2

| | Example 12 | Example 13 | Example 14 | Example 15 | Example 16 | Example 17 | Example 18 |
|---|---|---|---|---|---|---|---|
| Foaming agent | Isopentane/1,3,3,3-tetrafluoro-propene | Cyclopentane/1,3,3,3-tetrafluoro-propene | Cyclopentane/1,3,3,3-tetrafluoro-propene | Cyclopentane/1,3,3,3-tetrafluoro-propene | Cyclopentane/1,3,3,3-tetrafluoro-propene | Cyclopentane/1,3,3,3-tetrafluoro-propene | Cyclopentane/1,3,3,3-tetrafluoro-propene |
| First oven temperature (° C.) | 80 | 70 | 75 | 90 | 70 | 65 | 80 |
| Total amount of hydrocarbon of 6 or less hydrocarbons and 1,3,3,3-tetrafluoropropene (mol/22.4 L) | 0.56 | 0.52 | 0.55 | 0.28 | 0.87 | 0.88 | 0.58 |
| Content of hydrocarbon of 6 having less carbon atoms (mol/22.4 L) | 0.34 | 0.16 | 0.29 | 0.08 | 0.78 | 0.08 | 0.52 |
| Content of 1,3,3,3-tetrafluoropropene (mol/22.4 L) | 0.22 | 0.36 | 0.26 | 0.20 | 0.09 | 0.80 | 0.06 |
| Average boiling point of hydrocarbon of 6 or less hydrocarbons and 1,3,3,3-tetrafluoropropene, X1 (° C.) | 9.5 | 1.4 | 16.4 | 1.4 | 42.2 | −12.9 | 42.2 |
| Average boiling point of hydrocarbon of 6 or less hydrocarbons, X2 (° C.) | 49.0 | 49.0 | 49.0 | 49.0 | 49.0 | 49.0 | 49.0 |
| Foam thickness (mm) | 49.9 | 50.3 | 50.9 | 49.8 | 49.2 | 50.6 | 50.4 |
| Foam density (kg/m$^3$) | 30.1 | 28.8 | 27.5 | 30.6 | 28.6 | 40.3 | 27.3 |
| Closed cell ratio (%) | 96.6 | 91.4 | 92.8 | 90.2 | 91.3 | 90.8 | 94.6 |
| Average cell diameter (μm) | 103 | 128 | 118 | 148 | 133 | 138 | 123 |
| Void area proportion (%) | 0.05 | 0.08 | 0.06 | 0.11 | 0.07 | 0.09 | 0.06 |

TABLE 2-continued

| | | | | | | | |
|---|---|---|---|---|---|---|---|
| Presence or absence of urea trapped in bond | Yes | Yes | Yes | Yes | Yes | Yes | Yes |
| Initial thermal conductivity at 23° C. (W/mk) | 0.0189 | 0.0183 | 0.0187 | 0.0191 | 0.0198 | 0.0178 | 0.0201 |
| Initial thermal conductivity at 10° C. (W/mk) | 0.0179 | 0.0170 | 0.0179 | 0.0181 | 0.0190 | 0.0168 | 0.0189 |
| Thermal conductivity after acceleration test Measured at 10° C. (W/mk) | 0.0192 | 0.0185 | 0.0182 | 0.0198 | 0.0199 | 0.0186 | 0.0198 |

| | Example 19 | Example 20 | Example 21 | Example 22 | Comparative Example 4 | Comparative Example 5 | Comparative Example 6 |
|---|---|---|---|---|---|---|---|
| Foaming agent | Cyclopentane/ isobutane/1, 3,3,3- tetrafluoro- propene | Cyclopentane/ isobutane/1, 3,3,3- tetrafluoro- propene | Cyclopentane/ 1,3,3,3- tetrafluoro- propene | Cyclopentane/ 1,3,3,3- tetrafluoro- propene | 1,3,3,3- tetrafluoro- propene | Cyclopentane/ isobutane/1, 3,3,3- tetrafluoro- propene | Cyclopentane/ 1,3,3,3- tetrafluoro- propene |
| First oven temperature (° C.) | 70 | 80 | 80 | 80 | 80 | 90 | 65 |
| Total amount of hydrocarbon of 6 or less hydrocarbons and 1,3,3,3- tetrafluoropropene (mol/22.4 L) | 0.56 | 0.58 | 0.58 | 0.55 | 0.54 | 0.21 | 0.93 |
| Content of hydrocarbon of 6 having less carbon atoms (mol/22.4 L) | 0.45 | 0.41 | 0.44 | 0.33 | 0.00 | 0.16 | 0.84 |
| Content of 1,3,3,3- tetrafluoropropene (mol/22.4 L) | 0.11 | 0.17 | 0.15 | 0.22 | 0.54 | 0.05 | 0.09 |
| Average boiling point of hydrocarbon of 6 or less hydrocarbons and 1,3,3,3- tetrafluoropropene, X1 (° C.) | 4.8 | 19.5 | 32.0 | 21.8 | −19.0 | 29.0 | 42.2 |
| Average boiling point of hydrocarbon of 6 or less hydrocarbons, X2 (° C.) | 10.8 | 35.9 | 49.0 | 49.0 | — | 44.9 | 49.0 |
| Foam thickness (mm) | 50.3 | 51.2 | 50.6 | 50.6 | 48.1 | 50.0 | 51.1 |
| Foam density (kg/m³) | 27.4 | 27.8 | 27.4 | 27.6 | 31.8 | 30.3 | 27.1 |
| Closed cell ratio (%) | 95.2 | 95.3 | 94.8 | 95.3 | 78.3 | 86.1 | 92.1 |
| Average cell diameter (μm) | 118 | 126 | 118 | 122 | 115 | 128 | 120 |
| Void area proportion (%) | 0.04 | 0.04 | 0.05 | 0.05 | 0.09 | 0.14 | 0.06 |
| Presence or absence of urea trapped in bond | Yes | Yes | Yes | Yes | Yes | Yes | Yes |

TABLE 2-continued

| | | | | | | | |
|---|---|---|---|---|---|---|---|
| Initial thermal conductivity at 23° C. (W/mk) | 0.0198 | 0.0194 | 0.0195 | 0.0191 | 0.0180 | 0.0194 | 0.0204 |
| Initial thermal conductivity at 10° C. (W/mk) | 0.0190 | 0.0180 | 0.0183 | 0.0176 | 0.0169 | 0.0189 | 0.0206 |
| Thermal conductivity after acceleration test Measured at 10° C. (W/mk) | 0.0199 | 0.0191 | 0.0195 | 0.0189 | 0.0209 | 0.0204 | 0.0201 |

Example 23

Based on 100 parts by mass of Phenol resin A, 2.0 parts by mass of a composition containing 50% by mass of a block copolymer of ethyleneoxide-propyleneoxide and 50% by mass of polyoxyethylene dodecyl phenyl ether, in mass ratio, as a surfactant was mixed. Based on 100 parts by mass of the phenol resin into which the above surfactant was mixed, 7 parts by mass of a mixture comprising 20 mol % of isopentane and 80 mol % of 1,1,1,4,4,4-hexafluoro-2-butene as a foaming agent, in mol ratio, and 14 parts by mass of a composition comprising a mixture of 80% by mass of xylene sulfonic acid and 20% by mass of diethylene glycol as an acid curing catalyst were mixed with a mixing head of which the temperature was adjusted to 25° C., and supplied onto a moving face material.

The foamable phenol resin composition supplied onto the face material was introduced to a slat-type double conveyor heated to 85° C. so as to be sandwiched between two face materials, while a surface opposite to the surface in contact with the face material was covered with other face material. After cured for 15 minutes of a retention time, the foamable phenol resin composition was cured in a 110° C. oven for 2 hours to obtain a phenol resin foam.

As the face material, glass fiber non-woven fabric ("Dura-Glass Type DH70" manufactured by Johns-Manville Corporation, basis weight: 70 g/m$^2$) was used.

Example 24

A phenol resin foam was obtained in the same manner as in Example 23 except that a mixture of 3 mol % of cyclopentane, 7 mol % of isobutane, and 90 mol % of 1,1,1,4,4,4-hexafluoro-2-butene, in mol ratio, was used as the foaming agent and that 11 parts of the foaming agent was added based on 100 parts by mass of the phenol resin to which the surfactant had been mixed.

Example 25

A phenol resin foam was obtained in the same manner as in Example 23 except that a mixture of 3 mol % of cyclopentane, 12 mol % of isobutane, and 85 mol % of 1,1,1,4,4,4-hexafluoro-2-butene, in mol ratio, was used as the foaming agent and that 10 parts of the foaming agent was added based on 100 parts by mass of the phenol resin to which the surfactant had been mixed.

Example 26

A phenol resin foam was obtained in the same manner as in Example 23 except that a mixture of 3 mol % of cyclopentane, 12 mol % of isobutane, and 85 mol % of 1,1,1,4,4,4-hexafluoro-2-butene, in mol ratio, was used as the foaming agent, that 5 parts of the foaming agent was added based on 100 parts by mass of the phenol resin to which the surfactant had been mixed, and that the temperature of the first oven was set to 93° C.

Example 27

A phenol resin foam was obtained in the same manner as in Example 23 except that a mixture of 42 mol % of cyclopentane and 48 mol % of 1,1,1,4,4,4-hexafluoro-2-butene, in mol ratio, was used as the foaming agent, that 9 parts of the foaming agent was added based on 100 parts by mass of the phenol resin to which the surfactant had been mixed, and that the temperature of the first oven was set to 75° C.

Example 28

A phenol resin foam was obtained in the same manner as in Example 23 except that a mixture of 10 mol % of cyclopentane, 75 mol % of isobutane, and 15 mol % of 1,1,1,4,4,4-hexafluoro-2-butene, in mol ratio, was used as the foaming agent and that the temperature of the first oven was set to 65° C.

Example 29

A phenol resin foam was obtained in the same manner as in Example 23 except that a mixture of 5 mol % of cyclopentane, 5 mol % of isobutane, and 90 mol % of 1,1,1,4,4,4-hexafluoro-2-butene, in mol ratio, was used as the foaming agent, that 14 parts of the foaming agent was added based on 100 parts by mass of the phenol resin to which the surfactant had been mixed, and that the temperature of the first oven was set to 65° C.

Example 30

A phenol resin foam was obtained in the same manner as in Example 23 except that a mixture of 20 mol % of cyclopentane, 10 mol % of isobutane, and 70 mol % of 1,1,1,4,4,4-hexafluoro-2-butene, in mol ratio, was used as the foaming agent and that 9 parts of the foaming agent was added based on 100 parts by mass of the phenol resin to which the surfactant had been mixed.

Example 31

A phenol resin foam was obtained in the same manner as in Example 23 except that a mixture of 30 mol % of cyclopentane, 50 mol % of isobutane, and 20 mol % of 1,1,1,4,4,4-hexafluoro-2-butene, in mol ratio, was used as the foaming agent and that the temperature of the first oven was set to 80° C.

Example 32

A phenol resin foam was obtained in the same manner as in Example 23 except that a mixture of 30 mol % of cyclopentane, 30 mol % of isobutane, and 40 mol % of 1,1,1,4,4,4-hexafluoro-2-butene, in mol ratio, was used as the foaming agent and that the temperature of the first oven was set to 85° C.

Example 33

A phenol resin foam was obtained in the same manner as in Example 23 except that a mixture of 2 mol % of cyclopentane, 13 mol % of isobutane, and 85 mol % of 1,1,1,4,4,4-hexafluoro-2-butene, in mol ratio, was used as the foaming agent, that 5 parts of the foaming agent was added based on 100 parts by mass of the phenol resin to which the surfactant had been mixed, and that the temperature of the first oven was set to 95° C.

Comparative Example 7

A phenol resin foam was obtained in the same manner as in Example 23 except that the foaming agent used was 100 mol % of 1,1,1,4,4,4-hexafluoro-2-butene.

Comparative Example 8

A phenol resin foam was obtained in the same manner as in Example 23 except that a mixture of 80 mol % of cyclopentane and 20 mol % of 1,1,1,4,4,4-hexafluoro-2-butene, in mol ratio, was used as the foaming agent, that 14 parts of the foaming agent was added based on 100 parts by mass of the phenol resin to which the surfactant had been mixed, and that the temperature of the first oven was set to 70° C.

The content of the foaming agent per $22.4 \times 10^{-3}$ $m^3$ (22.4 L) spatial volume in the phenol resin foam obtained in the above Examples 23 to 33 and Comparative Examples 7 and 8, average boiling points X1 and X2, the properties and thermal conductivity evaluation results of the phenol resin foams obtained are shown in Table 3.

TABLE 3

|  | Example 23 | Example 24 | Example 25 | Example 26 | Example 27 | Example 28 | Example 29 |
|---|---|---|---|---|---|---|---|
| Foaming agent | Isopentane/1,1,1,4,4,4-hexafluoro-2-butene | Cyclopentane/isobutane/1,1,1,4,4,4-hexafluoro-2-butene | Cyclopentane/isobutane/1,1,1,4,4,4-hexafluoro-2-butene | Cyclopentane/isobutane/1,1,1,4,4,4-hexafluoro-2-butene | Cyclopentane/1,1,1,4,4,4-hexafluoro-2-butene | Cyclopentane/isobutane/1,1,1,4,4,4-hexafluoro-2-butene | Cyclopentane/isobutane/1,1,1,4,4,4-hexafluoro-2-butene |
| First oven temperature (° C.) | 85 | 85 | 85 | 93 | 75 | 65 | 65 |
| Total amount of hydrocarbon of 6 or less hydrocarbons and 1,1,1,4,4,4-hexafluoro-2-butene | 0.55 | 0.57 | 0.55 | 0.26 | 0.87 | 0.53 | 0.88 |
| Content of hydrocarbon having 6 or less carbon atoms (mol/22.4 L) | 0.11 | 0.06 | 0.08 | 0.04 | 0.44 | 0.45 | 0.08 |
| Content of 1,1,1,4,4,4-hexafluoro-2-butene (mol/22.4 L) | 0.44 | 0.51 | 0.47 | 0.22 | 0.44 | 0.08 | 0.80 |
| Average boiling point of hydrocarbon of 6 or less hydrocarbons and 1,1,1,4,4,4-hexafluoro-2-butene, X1 (° C.) | 32.0 | 30.3 | 27.5 | 27.5 | 41.0 | 0.9 | 31.4 |
| Average boiling point of hydrocarbon of 6 or less hydrocarbons, X2 (° C.) | 28 | 6 | −4 | −4 | 49 | −5 | 15 |
| Foam thickness (mm) | 49.1 | 49.8 | 50.2 | 47.2 | 50.2 | 51.1 | 48.3 |
| Foam density (kg/m³) | 30.3 | 27.8 | 27.6 | 30.2 | 27.9 | 32.1 | 30.1 |
| Closed cell ratio (%) | 95.5 | 95.8 | 94.9 | 90.3 | 93.8 | 91.3 | 91.8 |

TABLE 3-continued

| | | | | | | | |
|---|---|---|---|---|---|---|---|
| Average cell diameter (μm) | 109 | 112 | 118 | 112 | 121 | 128 | 112 |
| Void area proportion (%) | 0.06 | 0.05 | 0.06 | 0.08 | 0.11 | 0.09 | 0.08 |
| Presence or absence of urea trapped in bond | Yes | Yes | Yes | Yes | Yes | Yes | Yes |
| Initial thermal conductivity at 23° C. (W/mk) | 0.0174 | 0.0171 | 0.0174 | 0.0179 | 0.0186 | 0.0203 | 0.0176 |
| Initial thermal conductivity at 10° C. (W/mk) | 0.0170 | 0.0161 | 0.0163 | 0.0170 | 0.1790 | 0.0184 | 0.0174 |
| Thermal conductivity after acceleration test Measured at 10° C. (W/mk) | 0.0185 | 0.0173 | 0.0176 | 0.0191 | 0.0184 | 0.0198 | 0.0177 |

| | Example 30 | Example 31 | Example 32 | Example 33 | Comparative Example 7 | Comparative Example 8 |
|---|---|---|---|---|---|---|
| Foaming agent | Cyclopentane/ isobutane/1,1, 1,4,4,4- hexafluoro- 2-butene | Cyclopentane/ isobutane/1,1, 1,4,4,4- hexafluoro- 2-butene | Cyclopentane/ isobutane/1,1, 1,4,4,4- hexafluoro- 2-butene | Cyclopentane/ isobutane/1,1, 1,4,4,4- hexafluoro- 2-butene | Isopentane/1, 1,1,4,4,4- hexafluoro- 2-butene | Cyclopentane/ 1,1,1,4,4,4- hexafluoro- 2-butene |
| First oven temperature (° C.) | 85 | 80 | 85 | 95 | 85 | 70 |
| Total amount of hydrocarbon of 6 or less hydrocarbons and 1,1,1,4,4,4- hexafluoro- 2-butene | 0.55 | 0.58 | 0.56 | 0.23 | 0.56 | 0.91 |
| Content of hydrocarbon having 6 or less carbon atoms (mol/22.4 L) | 0.17 | 0.46 | 0.34 | 0.03 | 0.00 | 0.19 |
| Content of 1,1,1,4,4,4- hexafluoro- 2-butene (mol/22.4 L) | 0.39 | 0.12 | 0.22 | 0.20 | 0.56 | 0.74 |
| Average boiling point of hydrocarbon of 6 or less hydrocarbons and 1,1,1,4,4,4- hexafluoro- 2-butene, X1 (° C.) | 31.7 | 14.5 | 24.3 | 27.5 | 33.0 | 37.0 |
| Average boiling point of hydrocarbon of 6 or less hydrocarbons, X2 (° C.) | 29 | 10 | 19 | −4 | — | 49 |
| Foam thickness (mm) | 51.1 | 50.9 | 51.1 | 48.3 | 48.2 | 49.3 |
| Foam density (kg/m³) | 30.3 | 27.9 | 28.3 | 30.9 | 31.1 | 48.2 |
| Closed cell ratio (%) | 96.3 | 95.8 | 96.1 | 83.2 | 77.7 | 91.1 |
| Average cell diameter (μm) | 116 | 118 | 109 | 131 | 130 | 148 |
| Void area proportion (%) | 0.05 | 0.04 | 0.05 | 0.21 | 0.10 | 0.18 |
| Presence or absence of urea trapped in bond | Yes | Yes | Yes | Yes | Yes | Yes |

TABLE 3-continued

| | | | | | | |
|---|---|---|---|---|---|---|
| Initial thermal conductivity at 23° C. (W/mk) | 0.0180 | 0.0191 | 0.0187 | 0.0183 | 0.0168 | 0.0203 |
| Initial thermal conductivity at 10° C. (W/mk) | 0.0179 | 0.0178 | 0.0174 | 0.0168 | 0.0166 | 0.0206 |
| Thermal conductivity after acceleration test Measured at 10° C. (W/mk) | 0.0193 | 0.0191 | 0.0188 | 0.0194 | 0.0203 | 0.0208 |

The invention claimed is:

1. A phenol resin foam comprising a phenol resin, a hydrocarbon having 6 or less carbon atoms, and at least one halogenated hydroolefin selected from the group consisting of hydrofluoroolefins and hydrochlorofluoroolefins, and the phenol resin foam having a density of 10 kg/m$^3$ or more and 150 kg/m$^3$ or less,
wherein a sum of a content of the hydrocarbon having 6 or less carbon atoms and a content of the halogenated hydroolefin is from 0.23 to 0.90 mol, a content of the hydrocarbon having 6 or less carbon atoms is from 0.03 to 0.85 mol, and a content of the halogenated hydroolefin is from 0.05 to 0.85 mol, per 22.4×10$^{-3}$ m$^3$ of spatial volume in the phenol resin foam.

2. The phenol resin foam according to claim 1, wherein the halogenated hydroolefin comprises at least one selected from the group consisting of 1-chloro-3,3,3-trifluoropropene, 1,3,3,3-tetrafluoropropene, and 1,1,1,4,4,4-hexafluoro-2-butene.

3. The phenol resin foam according to claim 1, wherein the average boiling point of the hydrocarbon having 6 or less carbon atoms and the halogenated hydroolefin is from −15° C. to 48° C.

4. The phenol resin foam according to claim 1, wherein the hydrocarbon having 6 or less carbon atoms comprises pentane and/or pentene.

5. The phenol resin foam according to claim 2, wherein the halogenated hydroolefin is 1-chloro-3,3,3-trifluoropropene.

6. The phenol resin foam according to claim 5, wherein the average boiling point of the hydrocarbon having 6 or less carbon atoms and the 1-chloro-3,3,3-trifluoropropene is from 15° C. to 45° C.

7. The phenol resin foam according to claim 5, wherein the hydrocarbon having 6 or less carbon atoms comprises pentane and/or pentene.

8. The phenol resin foam according to claim 7, wherein the hydrocarbon having 6 or less carbon atoms comprises 60 to 100 mol % in total of pentane and/or pentene and 0 to 40 mol % of one or two or more selected from hydrocarbons having a boiling point of −50° C. to 5° C., based on a total amount of the hydrocarbon, and
wherein the average boiling point of the hydrocarbon having 6 or less carbon atoms is 0° C. or more and 50° C. or less.

9. The phenol resin foam according to claim 8, wherein the hydrocarbon having a boiling point of −50° C. to 5° C. comprises isobutane.

10. The phenol resin foam according to claim 2, wherein the halogenated hydroolefin is 1,3,3,3-tetrafluoropropene.

11. The phenol resin foam according to claim 10, wherein the average boiling point of the hydrocarbon having 6 or less carbon atoms and the 1,3,3,3-tetrafluoropropene is from −15° C. to 45° C.

12. The phenol resin foam according to claim 10, wherein the hydrocarbon having 6 or less carbon atoms comprises pentane and/or pentene.

13. The phenol resin foam according to claim 12, wherein the hydrocarbon having 6 or less carbon atoms comprises 40 to 100 mol % in total of pentane and/or pentene and 0 to 60 mol % of one or two or more selected from hydrocarbons having a boiling point of −50° C. to 5° C., based on a total amount of the hydrocarbon, and
wherein the average boiling point of the hydrocarbon having 6 or less carbon atoms is 10° C. or more and 50° C. or less.

14. The phenol resin foam according to claim 13, wherein the hydrocarbon having a boiling point of −50° C. to 5° C. comprises isobutane.

15. The phenol resin foam according to claim 2, wherein the halogenated hydroolefin is 1,1,1,4,4,4-hexafluoro-2-butene.

16. The phenol resin foam according to claim 15, wherein the average boiling point of the hydrocarbon having 6 or less carbon atoms and 1,1,1,4,4,4-hexafluoro-2-butene is from 0° C. to 48° C.

17. The phenol resin foam according to claim 15, wherein the hydrocarbon having 6 or less carbon atoms comprises pentane and/or pentene.

18. The phenol resin foam according to claim 17, wherein the hydrocarbon having 6 or less carbon atoms comprises 5 to 100 mol % in total of pentane and/or pentene and 0 to 95 mol % of one or two or more selected from hydrocarbons having a boiling point of −50° C. to 5° C., based on a total amount of the hydrocarbon, and
wherein the average boiling point of the hydrocarbon having 6 or less carbon atoms is −10° C. or more and 50° C. or less.

19. The phenol resin foam according to claim 18, wherein the hydrocarbon having a boiling point of −50° C. to 5° C. comprises isobutane.

20. The phenol resin foam according to claim 1, wherein thermal conductivities under 10° C. and 23° C. environments, respectively, are less than 0.0205 W/m·k.

21. The phenol resin foam according to claim 1, having a closed cell ratio of 90% or more, an average cell diameter of 40 μm or more and 300 μm or less, and a void area ratio of 0.2% or less.

22. The phenol resin foam according to claim 1, wherein the phenol resin has a urea bond.

23. The phenol resin foam according to claim 1, wherein a thermal conductivity under a 10° C. environment after conditions of being left to stand in a 110° C. atmosphere for 14 days is less than 0.020 W/m·k.

* * * * *